Figure 1:
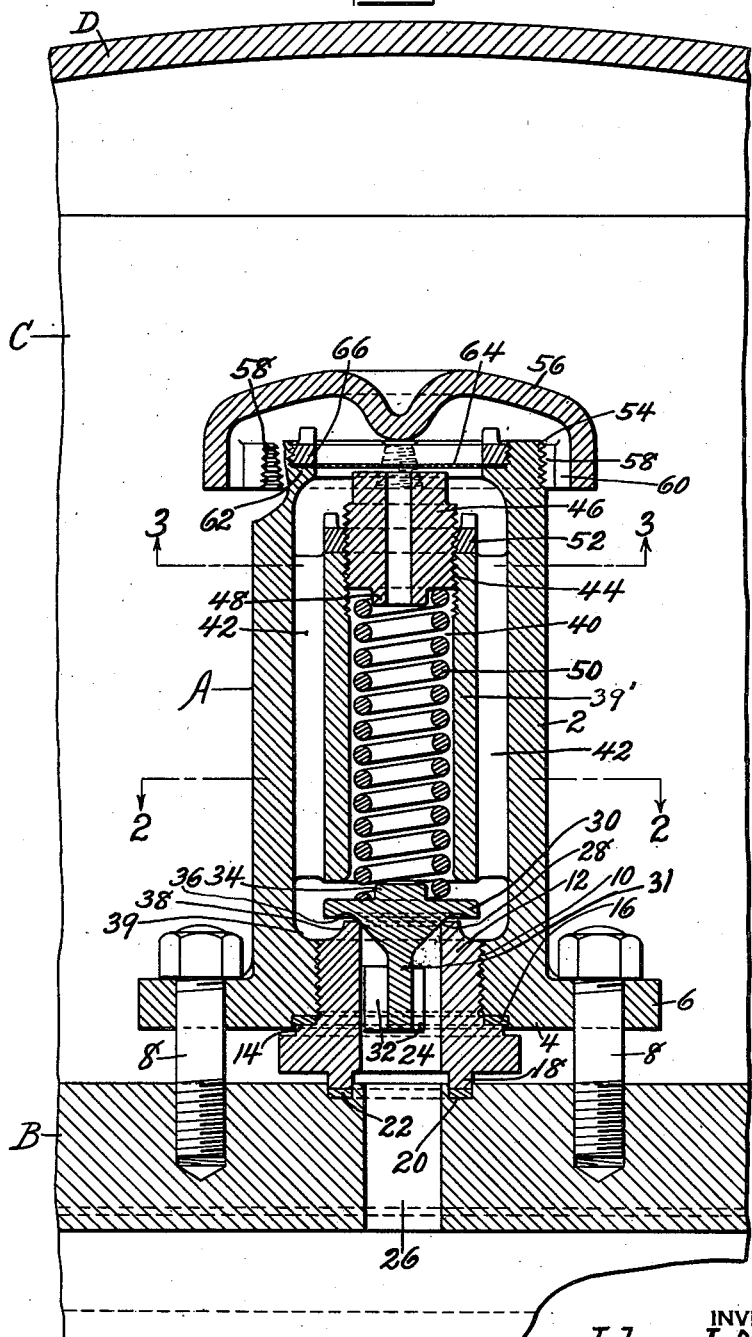

Dec. 31, 1940.  J. J. McBRIDE  2,226,732
SAFETY VALVE
Filed Jan. 22, 1937  2 Sheets-Sheet 1

INVENTOR
John J. McBride
BY
Donald U. Rich
ATTORNEY

Dec. 31, 1940.                J. J. McBRIDE                2,226,732
SAFETY VALVE
Filed Jan. 22, 1937              2 Sheets-Sheet 2
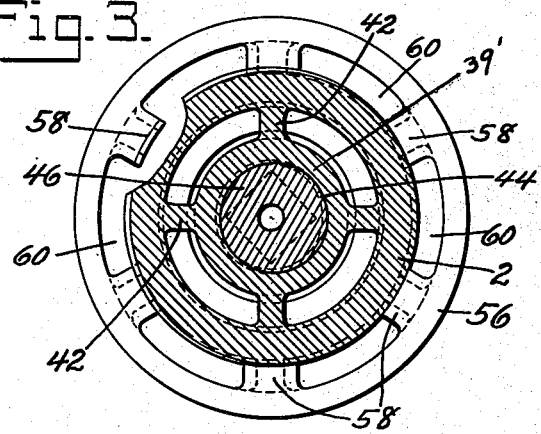
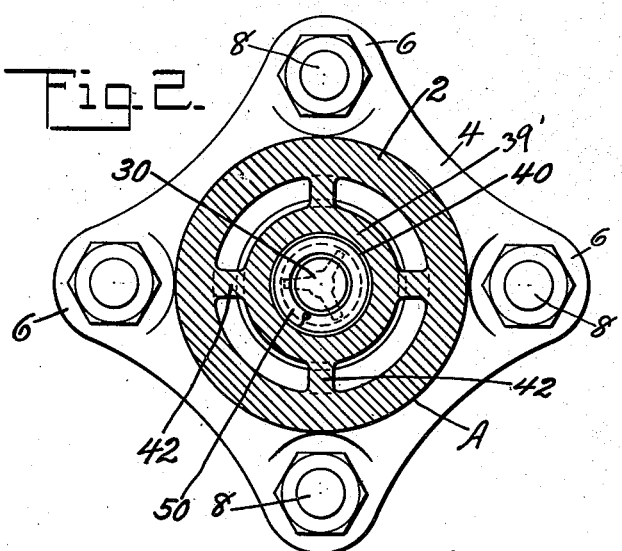
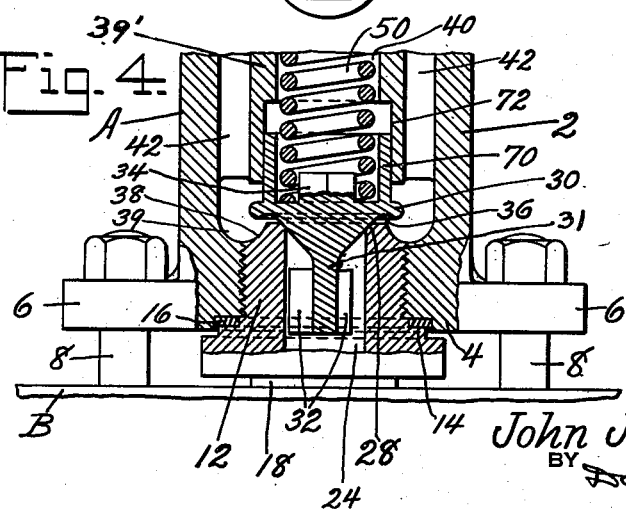
INVENTOR
John J. McBride
BY
ATTORNEY Patented Dec. 31, 1940

2,226,732

UNITED STATES PATENT OFFICE 2,226,732

SAFETY VALVE

John J. McBride, Bayonne, N. J., assignor to American Car and Foundry Company, New York, N. Y., a corporation of New Jersey Application January 22, 1937, Serial No. 121,757

1 Claim. (Cl. 137—53)

This invention relates to valves in general and in particular to safety valves of the "pop" type intended for use with corrosive substances, such as chlorine. In the transport of chlorine or other corrosive substances, which would tend to corrode the metal or crystallize on the valve parts, it is necessary that the spring be protected from these substances as much as possible. It is also necessary that the valve be constructed with a minimum number of parts and that it be formed as much as possible of material which will resist the corrosive effect of the material with which it is to be used. It is an object, therefore, of the invention to provide a safety valve of the protected type which is simple in construction and formed of a small number of parts not readily subject to corrosion.

Another object of the invention is the provision of a safety valve for tank cars in which the spring is protected from the escaping gases.

A further object of the invention is the provision of a safety valve of the "pop" type for tank cars in which the upward movement of the valve is limited, thus assisting in the prevention of chattering.

A still further object of the invention is the provision of a "pop" safety valve in which the valve seat and tank sealing portion are removable to permit of ready machining.

These and other objects of the invention will be apparent to persons skilled in the art from a study of the following description and accompanying drawings, in which:

Figure 1 is a sectional view showing the valve as applied to a tank;

Figs. 2 and 3 are sectional views taken on lines 2—2 and 3—3 respectively of Fig. 1 and showing details of the construction, and Fig. 4 is a sectional view of the lower portion of the valve showing a modified form of construction.

Referring now to the drawings in detail, it is seen that the valve A is secured to the tank manhole cover B within the protecting dome C, which has the customary dome cover D arranged to permit the escape of gas that may be exhausted from the safety valve. The valve is formed with a cylindrical casing 2 provided at its lower portion with a base 4 having a plurality of outstanding ears 6 adapted to receive bolts 8 by which it may be securely clamped to the manhole cover. The base portion of the casing is provided with a central opening threaded as at 10 to receive the removable valve seat member 12, having a shoulder 14 adapted to have clamping engagement with sealing washer or gasket 16, thus preventing any escape of gas past the threads 10. The lower portion of the valve seat member is provided with an annular shoulder 18 adapted to fit within a corresponding groove 20 formed in the manhole cover. This shoulder will be clamped upon washer 22 by bolts 8, thus securely sealing the joint against escape of any gas. The valve seat member has a central opening or bore 24, which is in substantial alignment with opening 26 of the manhole cover and which is provided at its upper edge with valve seat 28 adapted to cooperate with valve 30. The valve is formed with a lower guide portion or stem 31 having triangularly arranged guide fins 32 and an upper guide or spring centering projection 34 and also with a downwardly curved surface 36 which, in conjunction with the upwardly curved surfaces 38 and 39 of the valve seat member and casing respectively form a huddling chamber which prevents chattering of the valve.

The valve casing which, in the instance shown, is cast in one piece has an internal concentrically arranged spring barrel 39' joined to the casing by vertically arranged radiating ribs 42 which, as clearly shown in Fig. 1, are substantially co-extensive with said barrel. The barrel 39' is arranged intermediate the upper and lower ends of the valve casing and the upper end portion thereof is internally threaded at 44 to receive an adjusting plug 46 having its lower end portion provided with a projection 48.

The lower end portion of plug 46 constitutes the upper seat for a spring 50, the projection 48 defining a centering means. The lower end of spring 50 is seated on the valve 30, as clearly shown in Fig. 1. In order to lock this plug member 46 in any desired position lock nut 52 may be provided which will securely jamb the plug in an adjusted position.

The upper end of the outer casing is threaded as at 54 to receive the removable protecting and muffler cap 56 which is threaded on the casing by means of spaced threaded projections 58, thus providing openings 60 through which gas may escape from the tank interior. The upper inner portion of the casing is machined to provide a shoulder 62 adapted to receive a thin lead sealing disc or washer 64 which is securely held in place by lock nut 66, thus effectively sealing the "pop" valve against escape of small quantities of gas that might leak past the valve. The sealing disc or washer is preferably made of some substance, such as lead, which will rupture at a relatively low pressure and accordingly will not hamper in any way the operation of the valve, while at the same time offering protection against leakage of small quantities of gas.

It is thus seen that a valve is provided having a rough cast casing with an inner integral spring barrel or guide and that the only operations necessary on this casting are the threading for the valve seat member and for the muffler cap and sealing gasket nut. The valve seat member and valve, which necessarily require rather accurate machine work and fitting, may be readily worked upon and properly machined before assembly in the valve. Any damage to either the valve or valve seat member may be very readily repaired by replacement of parts without in any way affecting the remainder of the valve.

The operation of the valve is as follows, assuming the parts in the position as shown in Figure 1: Upon increase of the pressure within the tank beyond the value of which the spring 50 will retain the valve upon its seat, the valve will be lifted against this spring with a sudden action and will rise against the lower surface of the spring chamber. The valve will be held in this raised position so long as the pressure of the escaping gas, together with the lift provided by the huddling chamber, is sufficient to overcome the downward pressure of the spring. The gas upon escaping past the valve will build up a pressure within the area between the spring barrel and outer casing and will rupture the lead sealing disc almost immediately, thus permitting ready escape of the gas and thus indicating to any person who may later inspect the valve that the valve has operated. It is obvious that since the valve immediately upon opening will contact with the lower end of the spring chamber, it will prevent the entrance of gas to the spring chamber, thus preventing corrosion or weakening thereof.

Referring now to Figure 4 in which the parts identical with those previously described have been referred to by like numerals, the valve is provided on its upper surface with a piston like annular extension 70 surrounding the spring and spring centering lug. This extension is machined to have a sliding fit with the enlarged portion 72 of the spring chamber. With this form of valve it is obvious that the spring chamber is effectively sealed at all times against entrance of injurious gases and it is, of course, also obvious that if desired sealing or packing means may be used between the extension 70 and machined portion 72.

While the valve has been described in more or less detail, it is obvious that various modifications and rearrangements of parts other than those mentioned may be suggested to persons skilled in the art and all such modifications and rearrangements of parts are contemplated as fall within the scope of the following claim.

What is claimed is:

A safety valve for tank cars comprising in combination, a tubular casing having internally threaded portions formed at each end, the upper threaded portion terminating in an inwardly projecting annular shoulder, a frangible disk seating on said shoulder and closing the upper end of said casing, an annular nut engaging the upper threaded bore and binding said frangible disk in position against said shoulder, the lower threaded bore portion of said casing being of reduced diameter and terminating in an annular recess, a packing seating in said recess, a tubular externally threaded valve seat threaded into the lower threaded portion of said casing and extending above said portion, said valve seat having a lower annular seating projection for engaging a portion of said tank car and an outer intermediate annular flange, said intermediate annular flange having an upper face engaging said packing, a valve seating on said valve seat and including a radially extending annular spring seating portion formed with an upwardly projecting centering stud, a coiled spring seating on said annular spring seat, a tubular housing enclosing said spring and concentrically spaced from said casing and secured thereto, an externally threaded tubular spring adjusting plug threaded into the upper end of said housing, said plug including a centrally located and downwardly extending spring guide normally positioned in the upper end of said spring, a lock nut on said plug, and a cap secured to the upper end of said casing and spaced from said frangible disk.

JOHN J. McBRIDE.